United States Patent Office 3,623,902
Patented Nov. 30, 1971

3,623,902
METHOD OF MOVING A WORKING STATION WITH REFERENCE TO A SUBSTANTIALLY VERTICAL SURFACE
Paul Hammelmann, 17 Zum Sundern, 474 Oelde, Westphalia, Germany
Filed Feb. 26, 1969, Ser. No. 803,126
Claims priority, application Germany, Feb. 28, 1968, P 15 56 454.2
Int. Cl. B08b 3/02; B05c 5/00
U.S. Cl. 117—104 R                                   3 Claims

ABSTRACT OF THE DISCLOSURE

Method and arrangement for moving a working station with reference to a substantially vertical surface, particularly the external surface of a ship hull. A vehicle is advanced in a horizontal path adjacent to and along the surface and a working station, movably supported on the vehicle, is simultaneously moved in a substantially vertical path with reference to the travelling vehicle between an upper and a lower end position whereby it moves along a substantially vertical strip of the surface. On reaching one or the other of its end positions, the working station is rapidly shifted in the direction of advancement of the vehicle and thereupon again moved in a substantially vertical path with reference to the travelling vehicle along another substantially vertical strip of the surface which is directly adjacent to but does not overlap over the first vertical strip.

BACKGROUND OF THE INVENTION

The present invention relates to the movement of a working station with reference to a substantially vertical surface. More specifically the invention relates to such a movement for the purpose of inspecting or treating the surface.

In particular, the invention relates to a method for inspecting or treating large substantially vertical surfaces, particularly the external surface of the hull of a watercraft.

It is well known that it is frequently necessary to treat the external surface of the hull of watercraft, either for cleaning to remove barnacles, or for applying protective coatings such as paint, rust preventives or the like. Hand in hand with this necessity goes the requirement for close-up inspection of such surface. It is appropriate to point out at this juncture that, while the invention is hereafter to be discussed with respect to the external surfaces of watercraft hulls, it is fully applicable to other large substantially vertical surfaces and that its application for use on watercraft hulls is merely a particularly advantageous example of use.

Returning to the treatment of the external surfaces of watercraft hulls, it is pointed out that it is already known to clean such hulls by directing against their external surfaces a stream of water under pressures which range between substantially 150 and 200 atmospheres. However, this known approach to the problem of cleaning requires that the operator manipulating the discharged nozzle be capable of approaching the surface, or more particularly the surface area to be cleaned, within approximately two meters. Where larger ships are involved, that is ships in excess of approximately 5,000 tons, this necessitates the special construction of scaffolding or other supporting devices to make it possible for the operator to approach the hull surface to the requisite extent. This, however, is expensive and time consuming; in fact, the erection of the scaffolding or analogous supports quite often requires an amount of time which is a multiple of the actual working time needed for the cleaning of the hull surface.

It is evident, then, that improvements in this field are most desirable. At the same time it need not be particularly pointed out what has been said above with respect to the cleaning of external surfaces of watercraft hulls is fully applicable also with reference to any inspection which must be carried out at close range or with the application of protective coatings, such as paint or the like.

SUMMARY OF THE INVENTION

It is, accordingly, an object of the present invention to overcome the aforementioned disadvantages.

More particularly, it is an object of the present invention to provide a method for treating and/or inspection of large substantially vertical surfaces which is considerably simpler than heretofore known and which does not require the erection of special supports.

An additional object of the invention is to provide such a method which, because it does not rely on the erection of supports, permits the time required for carrying out the necessary steps to be decreased significantly, and thereby enables a correspondingly significant reduction in the expenses involved in carrying out these steps.

In pursuance of the above objects, and others which will become apparent hereafter, one feature of my invention resides in a method of moving a working station which is movably supported on a vehicle, with reference to a substantially vertical surface, particularly with reference to the external surface of the hull of a watercraft.

According to my method I advance the vehicle, on which the working station is movably supported, in a horizontal path adjacent to and along the surface in question, and I simultaneously move the working station in a substantially vertical path with reference to the travelling vehicle between an upper and a lower end position. In this manner, the working station moves along a substantially vertical strip of the surface in one substantially vertical direction. When the working station reaches a respective one of its end positions, it is rapidly shifted in the direction of advancement of the vehicle by a distance corresponding to the width of the substantially vertical strip and thereupon the working station is again moved in a substantially vertical path with reference to the travelling vehicle but in the opposite vertical direction whereby it moves along an additional substantially vertical strip of the surface which is adjacent to the first-mentioned strip but does not overlap therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
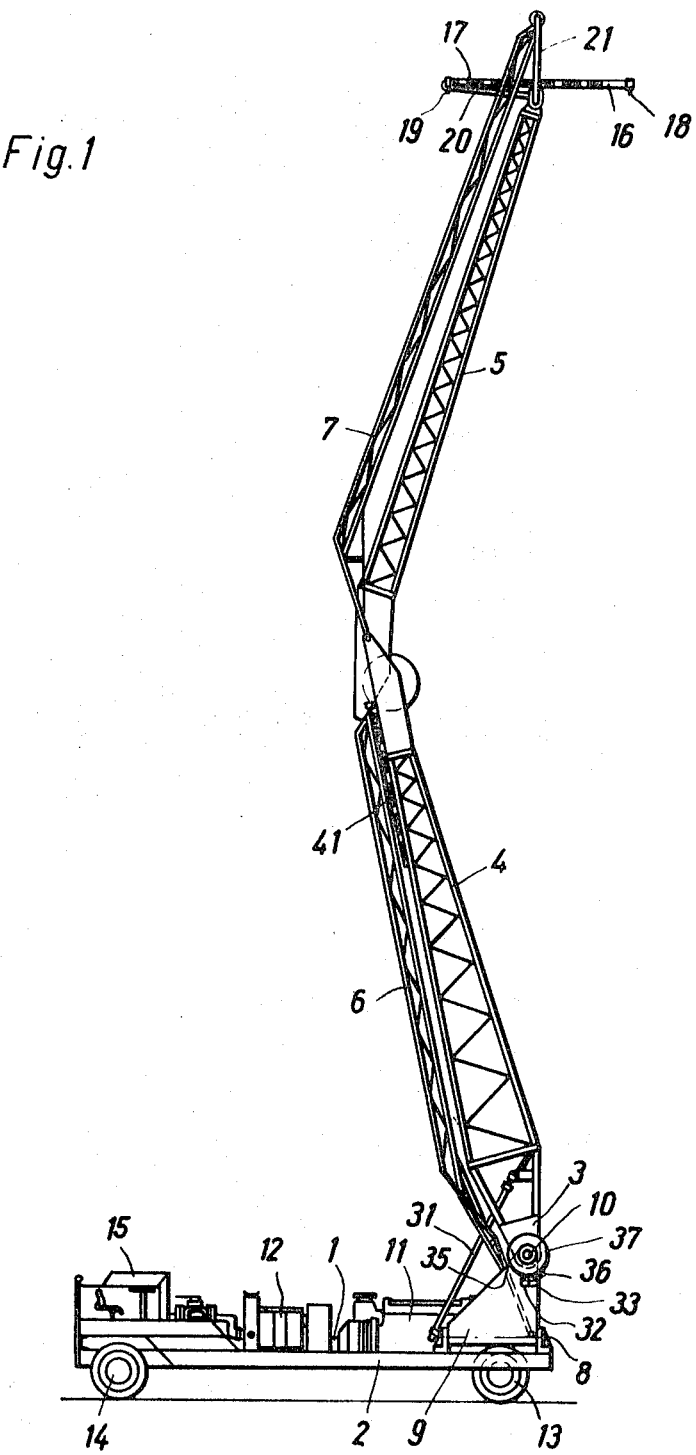
FIG. 1 is a side view, in diagrammatic illustration, of an arrangement for carrying out my invention and showing the working station in its upper end position.

Discussing now the drawing in detail, it will be seen that in FIG. 1 I have illustrated a vehicle 1 having a frame or chassis 2. The chassis carries a console 9 of known construction and on this console there is mounted the lower section 4 of a collapsible mast consisting of two sections, namely the lower section 4 and the upper section 5. As shown in FIG. 1 in particular, the lower section 4 is mounted with its lower end on the console 9 turnable about an axis 10 which extends transversely to the elongation of the vehicle 1, and accordingly transversely to its direction of movement. The mast 4, 5 is further turnably tiltable about a horizontal axis 8 which extends in parallelism with the elongation of the vehicle 1 and therefore with its direction of movement. A suitable engine, such as a diesel engine 11, is provided on the frame 2 and serves to drive in the illustrated embodiment a high pressure pump 12, as well as a non-illustrated compressor and other non-illustrated components. The vehicle 1 further comprises a rear or drive axle 13 which is hydraulically driven, with the pressure fluid being preferably oil, and a front or a steering axle 14, as well as a control cockpit 15.

In addition I may provide on the vehicle 1 a waterbath which is heatable in suitable manner and is not illustrated because it is conventional. The purpose of this is to heat materials, such as rust proofing or other protective materials, which are to be sprayed onto a surface being treated. In this manner it is assured that these materials have the requisite viscosity independently of the prevailing ambient temperature, and this in turn guarantees that when they are applied to a surface the protective layer obtained will have the requisite thickness.

The mast sections 4 and 5 have associated with them parallel guidance members 6 and 7 of known construction.

The upper end of the mast section 5 carries the working station which is preferably and ordinarily constructed either as a high pressure nozzle from which cleaning fluid, such as water, is ejected at high pressure against the surface to be treated, or as a spray nozzle for paint or other protective substances, such as rust proofing materials. However, it is possible to construct the working station as a so-called gondola or bucket in which an operator may be carried along the surface for inspection and/or working purposes. In the illustrated embodiment, I have shown the working station to be constructed as a tubular high pressure ejection nozzle 16 through which water is to be ejected at high pressure against the surface for cleaning purposes. The nozzle 16 is mounted on a supporting tube 17 for movement to and fro. The supporting tube 17 in turn carries at its opposite ends rollers 18 and 19 which cooperate with the surface being treated. It is carried on a jib 20 which is mounted on the upper end of the mast section 7 for turning movement about a vertical axis 21.

Figure 4:
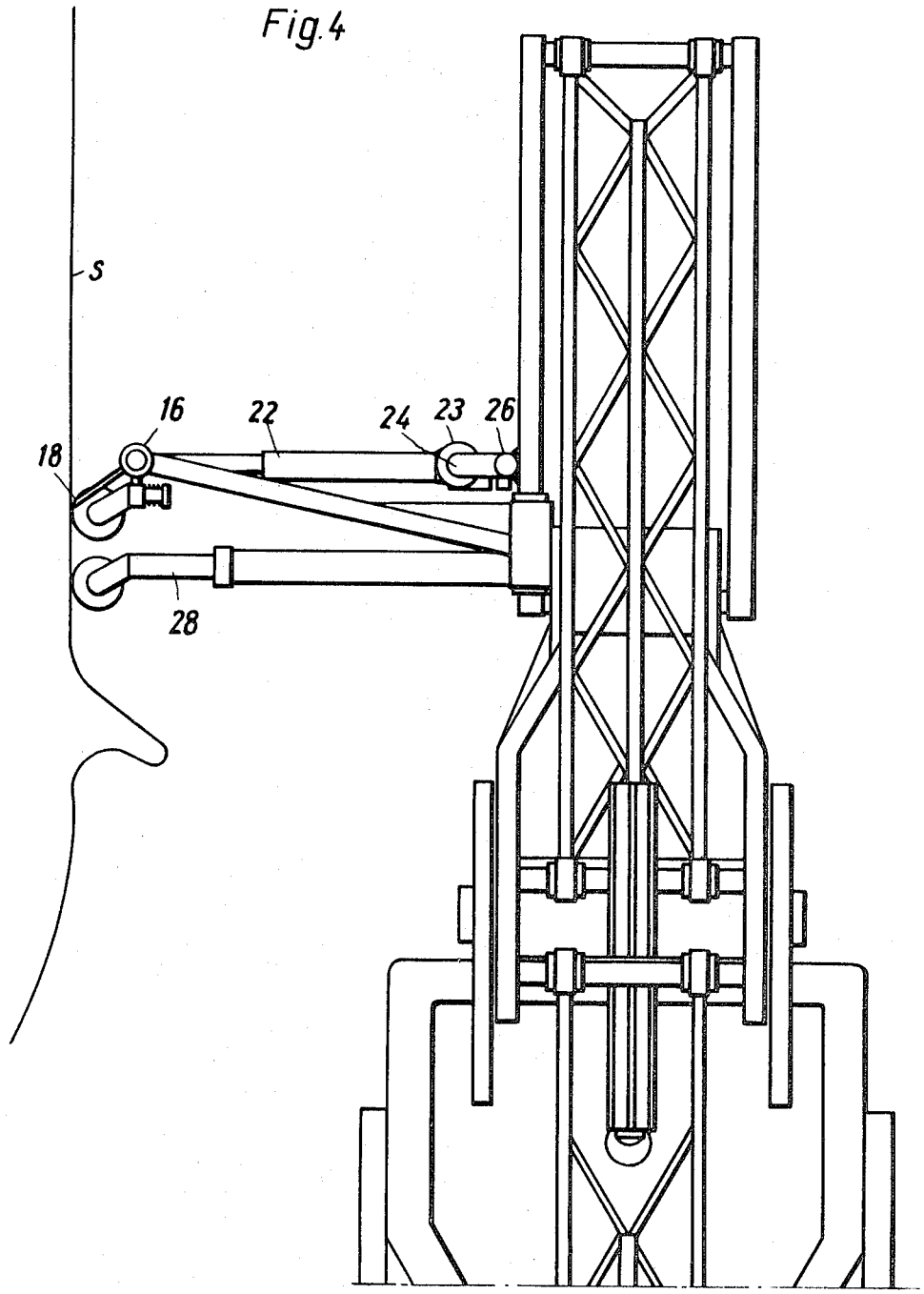
FIG. 4 is a fragmentary detailed view of FIG. 3, showing on an enlarged scale.
Figure 5:
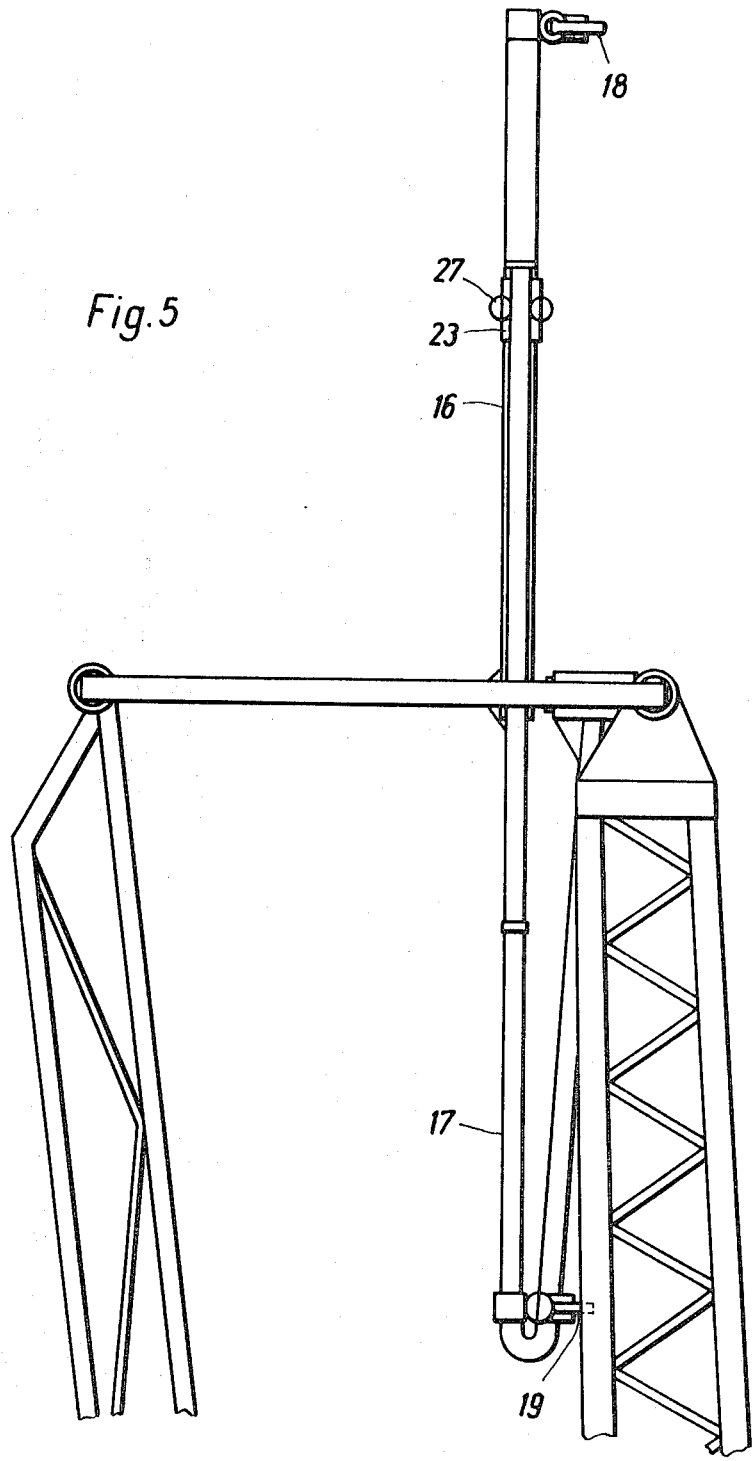
FIG. 5 illustrates, on an enlarged scale, details of the arrangement of the working station at the upper end portion of the mast of FIG. 1, but with the mast in retracted position.

As shown in FIG. 4, the illustrated embodiment further provides a transverse jib 22 whose free end is provided with a sliding sleeve 23 which surrounds a guide rod 24 extending parallel to the nozzle 16 to which latter the transverse jib 22 is connected. The purpose of this arrangement is to compensate for the reaction forces acting upon the nozzle 16 when water is ejected therefrom at high pressure. An additional tube 26 is connected to the guide rod 24 via connecting members 25 and cooperates with the rollers 27 which are provided on the sliding sleeve 23, as shown in FIG. 5. The purpose of these rollers is to limit the freedom of movement of the nozzle 16. However, it should be understood that the provision of the additional tube 26 with the rollers 27 is optional and my novel arrangement will be operative without it.

I have found it advantageous to construct the transverse jib 22 as a pressure cylinder which is acted upon by the high pressure water being used for cleaning purposes and is so constructed that it is capable of compensating for most of the reaction force resulting from the ejection of the high pressure water from the nozzle 16. The construction of the transverse jib 22 in this manner imparts to the manner in which the nozzle 16 is mounted a certain compensatory ability which guarantees uniform spacing from the surface. It will be appreciated that this is advantageous because of the inertia of the masses to be moved, the unevennesses of the surface to be cleaned or treated, and in the ground on which the vehicle moves, as well as the inertia of the sensing device which is to be described and which serves primarily to effect constant spacing of the working station from the surface being treated.

Figure 2:
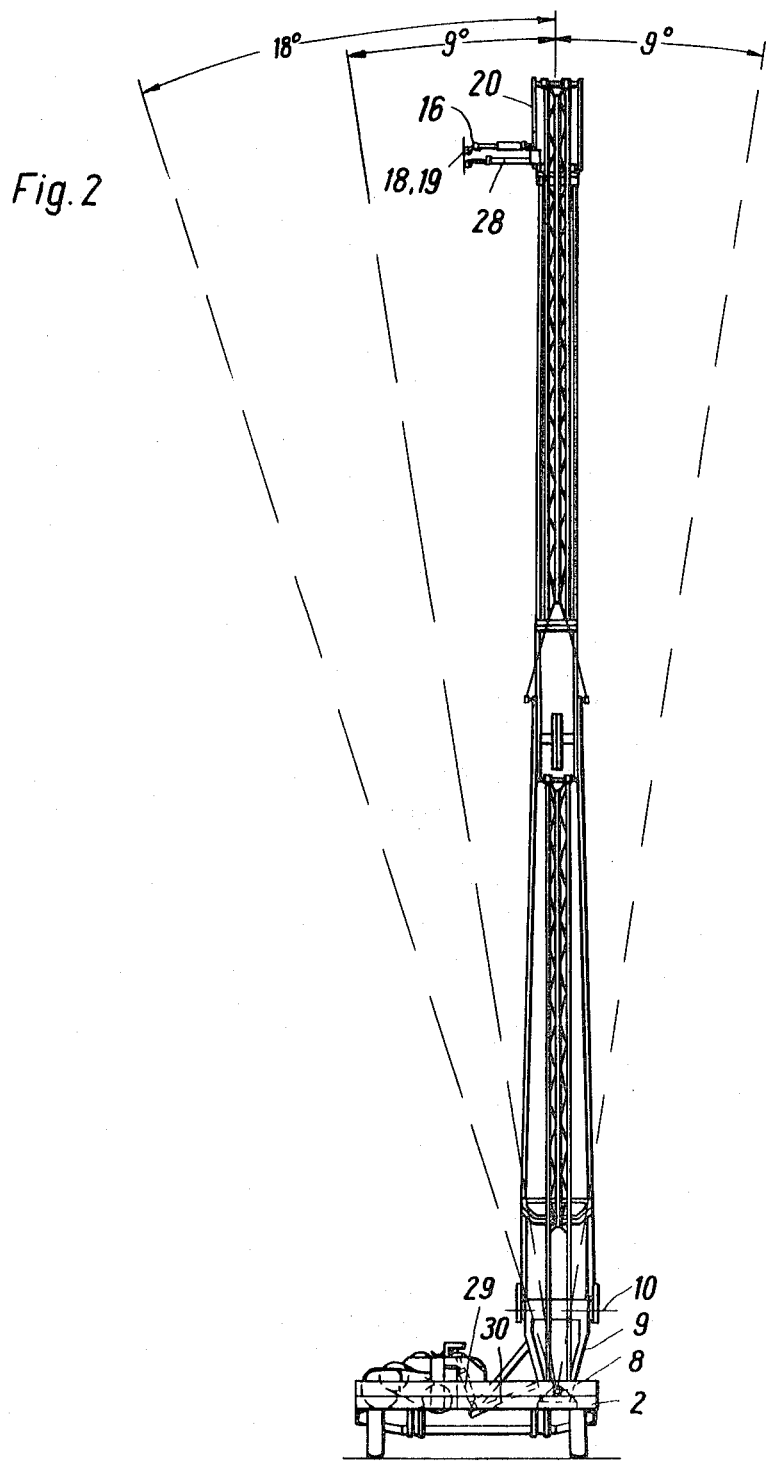
FIG. 2 is an end view of FIG. 1.
Figure 3:
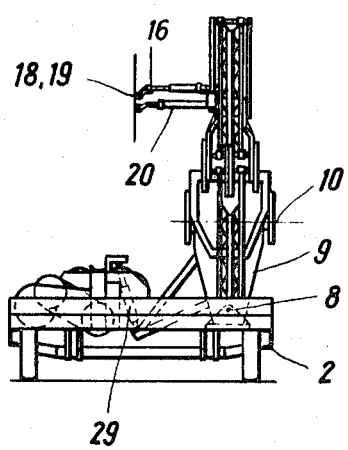
FIG. 3 is a view similar to FIG. 2, but showing the arrangement with the working station in its lower end position.
Figure 6:
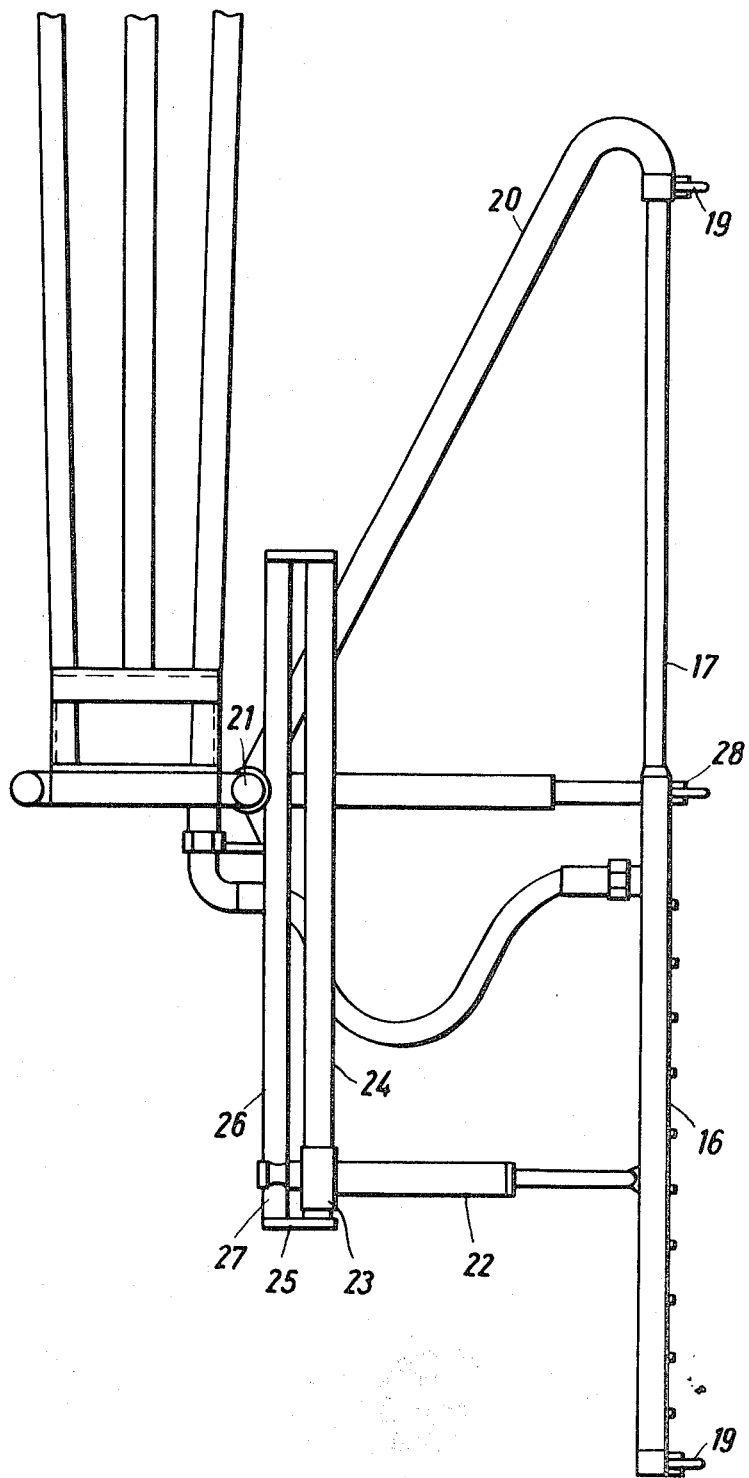
FIG. 6 is a top plan view of FIG. 5.

The just-mentioned sensing device is illustrated clearly in FIG. 6 where it will be seen in the present embodiment to include a feeler 28 which cooperates with the surface (see also FIG. 4 for the surface is shown as the external surface of a watercraft hull) and which serves to actuate the drive which effects tilting of the mast 4, 5 about the axis 8. It should be remembered that this axis 8 extends in substantial parallelism with the surface to be treated because it is parallel to the path along which the vehicle 1 advances, and this path is of course parallel to the surface. In the illustrated embodiment, the drive for tilting of the mast 4, 5 about the axis 8 is a hydraulic cylinder 29 as shown in FIG. 2, which is connected with a console 30 which latter is in turn rigid with the console 9. The extent to which the hydraulic cylinder 29 can tilt the mast 4, 5 about the axis 8 is illustrated in dashed lines in FIG. 2 and makes the illustrated arrangement simple on all types of ship hulls. Of course, the illustrated tilting angles can be readily changed and how this is accomplished will be obvious to those skilled in the art.

The actual cooperation between the feeler 28 and the hydraulic cylinder 29 will be discussed below with respect to FIG. 9. However, it will be apparent already that the feeler guarantees that the working station will always be at a predetermined distance from the surface being treated, and of course this distance may be zero if this should be desired, in which latter case the rollers associated with the nozzle 16, or the nozzle 16 itself, may be in direct contact with the surface, as for instance as shown in FIG. 4.

As the vehicle 1 moves at constant speed in its horizontal path along the surface to be treated, the mast must be alternately collapsed and upwardly extended. In the illustrated embodiment, this is achieved via the hydraulic cylinder 31 illustrated in FIG. 1 and reversal of movement of the mast sections 4 and 5 with respect to one another, that is reversal of movement as the mast sections reach respectively the upper and lower end positions, is controlled via limits which is 32 and 33 which cooperate with cams 35 and 36 adjustably arranged on a disc 37 which is rigidly connected with the lower end of the mast section 4, as illustrated in FIG. 1.

In operation of the arrangement, the vehicle 1 advances in its aforementioned horizontal path at constant speed and the mast sections 4 and 5 are constantly collapsed and erected. The parallel guidance members 6 and 7 serve to assure that the working station remains horizontal during this movement. If the general plane of the surface being treated is not entirely vertical but is inclined away from the path along which the vehicle 1 advances, then the feeler 28 generates a signal which actuates the hydraulic cylinder 29 via which the mast 4, 5 is tilted about the axis 8 in the sense indicated by the broken lines of FIG. 2, that is to one or the other side of the horizontal path along which the vehicle 1 advances. During the upward or downward movement of the mast sections 4, 5 and the advancement of the vehicle 1, the working station moves in the direction opposite the direction of advancement of the vehicle 1 with a speed corresponding to the speed of advancement of the vehicle. Thus, the working station remains stationary with respect to the surface being treated, except for movement in vertical direction relative to the surface.

Figure 7:
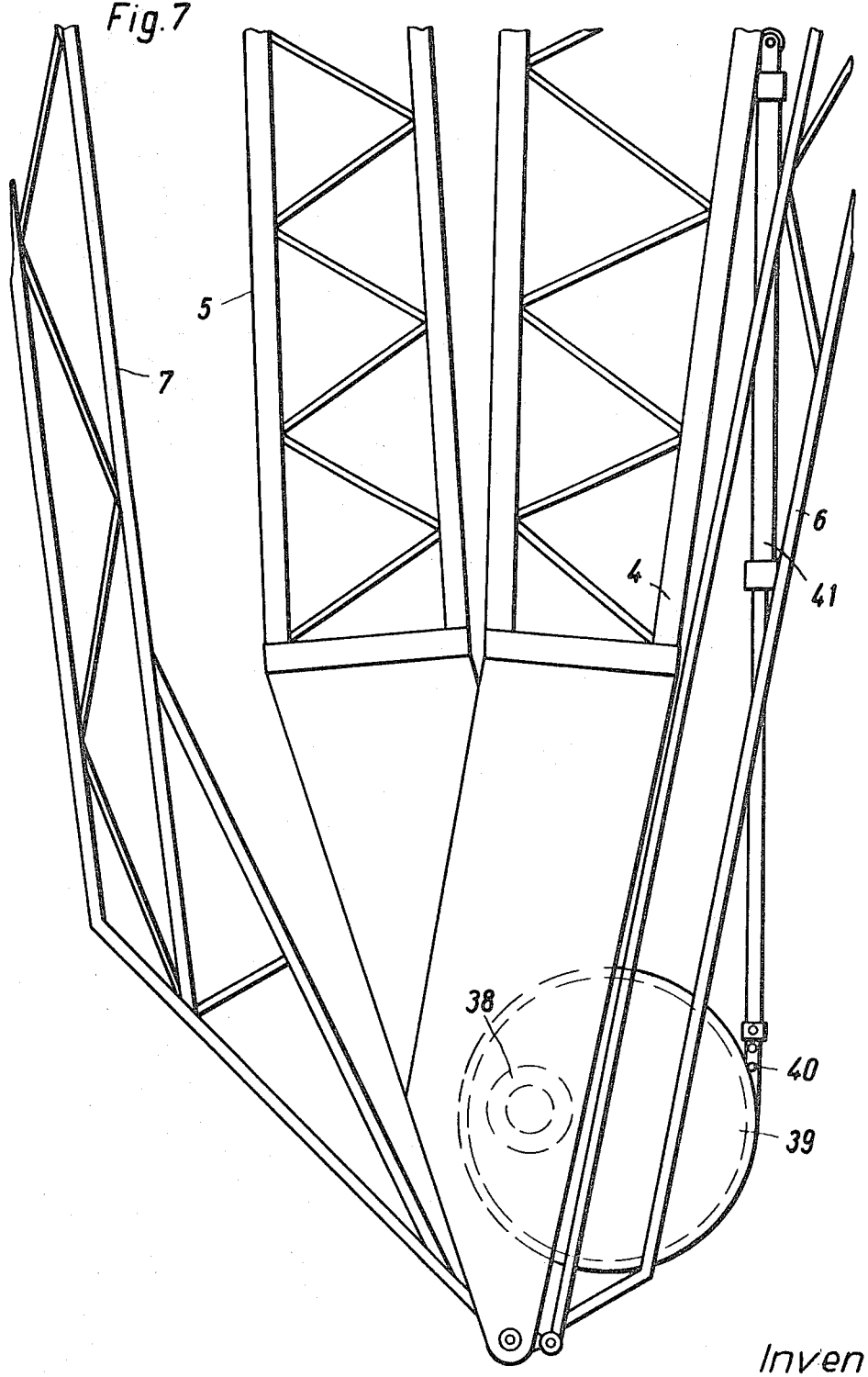
FIG. 7 is a detailed view, on an enlarged scale, and in side view, of the joint connecting the mast sections with one another.
Figure 8:
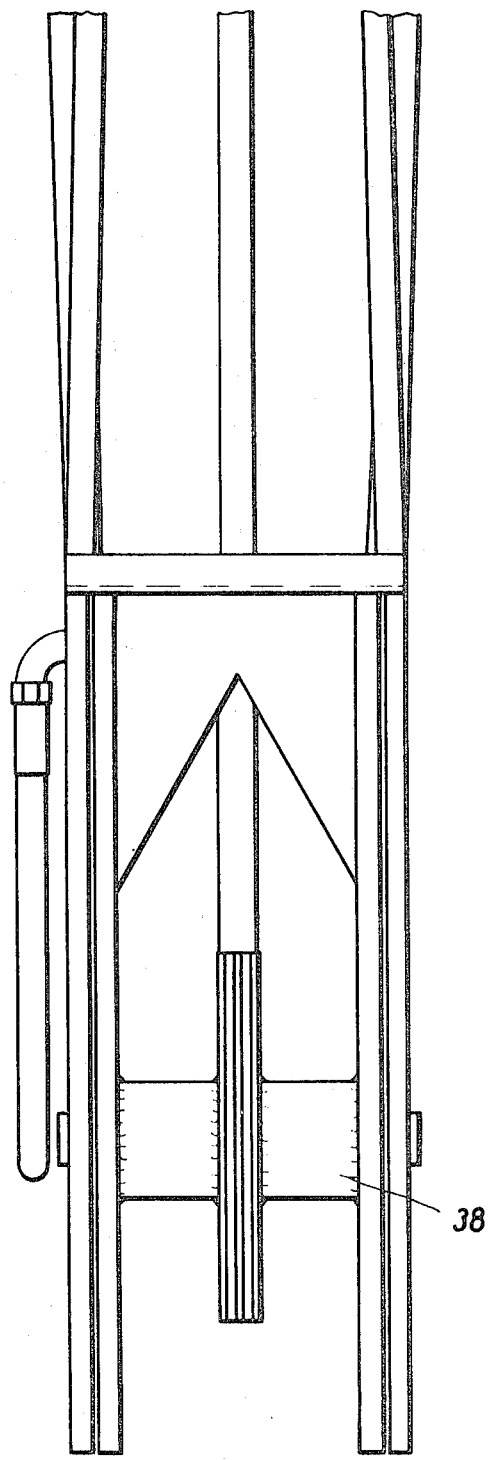
FIG. 8 is a plan view of FIG. 7.

A compensating arrangement is provided for compensating for the weight of the upper mast section 5. This is illustrated in FIG. 7 and includes a hollow shaft 38 rigidly connected with the lower end of the mast section 5 and having connected thereto an eccentric disc 39. A flexible draft member 40 partially or completely is convoluted about the periphery of the disc 39 to which it is connected with one of its ends, whereas its other end is connected to a drawing device 41 which in the illustrated embodiment is configurated as a hydraulic cylinder secured to the mast section 4. When the mast is collapsed, as shown in FIG. 7, the eccentric disc has the longest lever arm with respect to the drawing device 41 whereas, when the mast is erected as in FIG. 1, it has the smallest lever arm. This arrangement serves to assist the parallel guidance member 6 which therefore can be of rather light construction and this, in turn, makes it possible to hold the tilted mass of the mast at a lower level than would otherwise be feasible.

It will be appreciated from what has already been stated that the major functions of the arrangement are hyraulically controlled. This includes extending and collapsing of the mast, advancing of the vehicle 1, continuous movement of the working station with respect to the advancement of the vehicle and maintenance of the working station at a predetermined distance from the surface to be treated, which distance may be zero.

Figure 9:
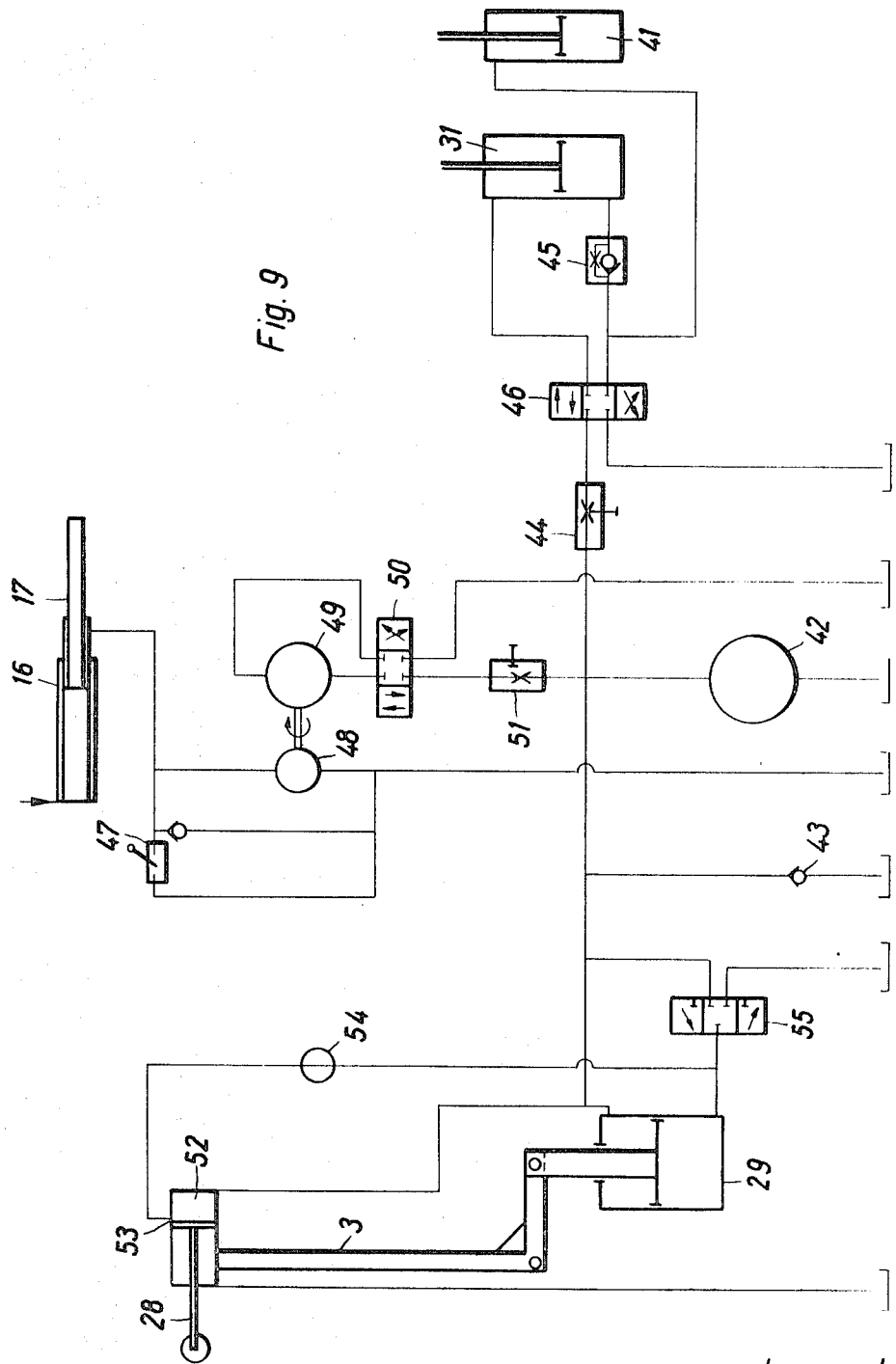
FIG. 9 is a diagram illustrating the hydraulic circuits of the embodiments shown in FIGS. 1–7.

FIG. 9 shows the hydraulic connections involved. I provide a gear pump 42 which is protected from overloading by a relief valve 43 which in the illustrated embodiment is set for approximately 80 kp./cm.² Cylinders 31 and 41 serve to effect extending and collapsing of the mast. An adjustable valve 44 serves to regulate the speed of the upward movement of the mast, that is the movement to the erected position thereof. An auxiliary cylinder 41 serves to aid in the erection of the mast section 5 and is pressurized only in one direction, namely when the cylinder 31 is activated. The speed of downward movement of the mast, that is the speed of movement of the mast to its collapsed position, is controlled by a throttling valve 45 because only the small surface of the cylinder 41 and the cylinder 41 are not pressurized during this movement.

A four-way valve 46, which may be manually activated or else automatically via the limits which is 32 and 33 which are secured on the joint 9, serves to initiate the movement from the lower end position towards erected position, and vice versa. Cams 35 and 36 provided on the disc 37 limit the stroke or lift during such movement of the mast. The automatic actuations via the limits which is 32 and 33 makes it possible to arrest the mast for approximately one-half second in its respective upper and lower end positions while the magnetic valve 47 is actuated and the nozzle 16 shifted to opposite position by compressed air.

During movement of the vehicle 1, the oil pump 48, which is rigidly coupled with the oil drive motor 49, serves to move the nozzle 16 at the same speed as the vehicle 1 but in opposite direction to the direction of advancement of the vehicle, the valve 47 being closed at this time. The oil drive motor 49 is fed via a manually activated four-way valve 50 which enables control of the vehicle movements between a standing position, a forward movement and a backward movement. An adjustable valve 51 makes possible a continuously variable speed adjustment. A change-over gear is arranged between the drive motor 49 and the differential axis of the vehicle 1, and makes possible the movement of the vehicle at two different speeds. The working station may in the illustrated embodiment be pressed against the surface to be treated with a pressure of approximately 20 kp. which is automatically maintained. The cylinder 29 is always fully pressurized on the small surface, and also the cylinder 52 of the feeler 28. The control bore 53 serves for pressurizing the larger cylinder area, so that a predetermined regulatable spacing of the mast is always obtained with a predetermined contact pressure which is determined through the pressurized surfaces of the cylinder. A valve 54 is provided which, when closed, makes possible manual tilting of the mast about the axis 8 with the help of the three-way valve 55.

It will be appreciated, as already pointed out earlier, that the high pressure nozzle 16 may be replaced by a spray nozzle for spraying paint or other protective substances onto the surface, and that in place of either of these possibilities a bucket or gondola may be mounted for carrying an operator for repair and/or inspection purposes.

It should be pointed out that in the illustrated embodiment the mast sections 4 and 5 is constructed in lattice or grid fashion and composed of tubular members. The use of tubular members makes it possible to avoid the necessity for separate hoses or conduits supplying water, paint or the like to the working station because certain of the tubular members of the mast sections 4 and 5 may be made to communicate with one another and the materials to be supplied to the working station, that is here the nozzle 16, may be advanced through these communicating tubular members which thus serve as a supply conduit. This of course eliminates the use of separate conduits and for complicated guidance and support arrangements therefor, and further simplifies the construction with attending economies.

It will be understood that each of the elements described above, or two or more together, may also find a useful application in other types of constructions differing from the types described above.

While the invention has been illustrated and described as embodied in an arrangement for treating or inspecting the external surface of a ship's hull, it is not intended to be limited to the details shown, since various modifications and structural changes may be made without departing in any way from the spirit of the present invention.

What is claimed as new and desired to be protected by Letters Patent is set forth in the appended claims.

1. A method of moving a working station which is movably supported on a vehicle, with reference to a substantially vertical surface, particularly with reference to the external surface of the hull of a watercraft, comprising the steps of advancing the vehicle at a constant first speed in a horizontal path adjacent to and along said surface, in one direction; simultaneously moving the working station along an upright strip of said surface with reference to the traveling vehicle between an upper and a lower end position, and moving the working station relative to said vehicle in an opposite direction to said one direction at said constant first speed; rapidly shifting the working station in the direction of advancement of the vehicle at a higher second speed when the working station reaches the respective end position, and by a distance corresponding to the width of said strip; and thereupon repeating the preceding steps whereby the working station moves along an additional upright strip of said surface adjacent and parallel to the first-mentioned strip.

2. A method as defined in claim 1, said vehicle advancing and said working station moving at substantially constant rates of travel.

3. A method as defined in claim 1, wherein said surface is inclined transversely of said horizontal path so that the distance between said surface and said path is different at the respective end portions of said working station; and further comprising the step of maintaining said working station at a predetermined distance from said surface at all times.

References Cited
UNITED STATES PATENTS

| | | | |
|---|---|---|---|
| 667,369 | 2/1901 | Redman | 118—305 |
| 2,098,262 | 11/1937 | Temple | 118—207 X |
| 2,444,811 | 7/1948 | Crom | 118—305 X |
| 3,099,852 | 8/1963 | Grant | 15—21 CO X |
| 3,104,406 | 9/1963 | Rhodes | 15—21.0 |
| 3,196,472 | 7/1965 | Ventrella | 15—21.0 |
| 3,224,108 | 12/1965 | Flaming | 15—DIG 2 |
| 3,439,372 | 4/1969 | Collier | 15—21.0 |
| 3,442,027 | 5/1969 | Hurwitz | 15—405 X |
| 3,460,177 | 8/1969 | Rhinehart | 15—21 CO |
| 1,079,208 | 11/1913 | Browne | 114—222 |
| 2,885,998 | 5/1959 | Farries | 118—323 |
| 3,039,429 | 6/1962 | Maens | 118—109 |

JOHN P. McINTOSH, Primary Examiner

U.S. Cl. X.R.

114—222; 118—305, 323; 134—42